United States Patent
Oda et al.

(10) Patent No.: US 9,511,669 B2
(45) Date of Patent: Dec. 6, 2016

(54) VEHICULAR INPUT DEVICE AND VEHICULAR COCKPIT MODULE

(71) Applicants: DENSO CORPORATION, Kariya, Aichi-pref. (JP); MAZDA MOTOR CORPORATION, Aki-gun, Hiroshima (JP)

(72) Inventors: Yusuke Oda, Gamagori (JP); Seiji Hisada, Higashihiroshima (JP)

(73) Assignees: DENSO CORPORATION, Kariya (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/747,245

(22) Filed: Jun. 23, 2015

(65) Prior Publication Data
US 2015/0367729 A1 Dec. 24, 2015

(30) Foreign Application Priority Data
Jun. 24, 2014 (JP) ................................. 2014-129087

(51) Int. Cl.
*B60K 35/00* (2006.01)
*B60K 37/06* (2006.01)

(52) U.S. Cl.
CPC .............. *B60K 35/00* (2013.01); *B60K 37/06* (2013.01); *B60K 2350/1052* (2013.01); *B60K 2350/352* (2013.01)

(58) Field of Classification Search
CPC .......................... B60K 35/00; B60K 2350/352
See application file for complete search history.

(56) References Cited

U.S. PATENT DOCUMENTS

| | | | | |
|---|---|---|---|---|
| 7,239,947 | B2 * | 7/2007 | Suzuki | G01C 21/3664 701/36 |
| 8,626,387 | B1 * | 1/2014 | Nagata | G06F 7/00 345/173 |
| 2005/0052426 | A1 * | 3/2005 | Hagermoser | B60K 35/00 345/173 |
| 2007/0244613 | A1 | 10/2007 | Ishikawa et al. | |

(Continued)

FOREIGN PATENT DOCUMENTS

| | | |
|---|---|---|
| JP | 2005-047412 A | 2/2005 |
| JP | 2006-335112 A | 12/2006 |

(Continued)

OTHER PUBLICATIONS

U.S. Appl. No. 14/747,268, filed Jun. 23, 2015, Denso Corp.

*Primary Examiner* — Rodney Butler
*Assistant Examiner* — Frederick Brushaber
(74) *Attorney, Agent, or Firm* — Posz Law Group, PLC

(57) ABSTRACT

The present disclosure provides a vehicular input device, which is arranged in a vehicle having a meter hood protruding toward a driving seat from an instrument panel and surrounding a meter, for detecting an operation of a driver based on an input screen image displayed on a display device arranged on the instrument panel at a side of the meter hood. The vehicular input device includes: a detection unit that is arranged at a side surface of the meter hood and is arranged between the display device and the driving seat; and a display control unit that changes a display mode of the display device in response to an output of the detection unit.

11 Claims, 6 Drawing Sheets

(56) References Cited

U.S. PATENT DOCUMENTS

| | | | | |
|---|---|---|---|---|
| 2009/0132130 A1* | 5/2009 | Kumon | ................ | B60K 35/00 |
| | | | | 701/49 |
| 2011/0279364 A1 | 11/2011 | Koshiyama et al. | | |
| 2013/0166146 A1* | 6/2013 | Tanaka | ................ | G06F 3/0488 |
| | | | | 701/36 |
| 2014/0018974 A1* | 1/2014 | Okita | ................ | B60W 30/20 |
| | | | | 701/1 |
| 2014/0019913 A1* | 1/2014 | Newman | ............ | G06F 3/0488 |
| | | | | 715/810 |
| 2014/0172231 A1 | 6/2014 | Terada et al. | | |
| 2015/0066238 A1* | 3/2015 | Todd | ................ | B60K 28/063 |
| | | | | 701/1 |
| 2015/0120150 A1* | 4/2015 | Kreder | ................ | B60N 2/06 |
| | | | | 701/49 |
| 2015/0169135 A1* | 6/2015 | Lee | ................ | G06F 3/0426 |
| | | | | 345/175 |
| 2015/0291032 A1* | 10/2015 | Kim | ................ | B60K 37/06 |
| | | | | 701/36 |
| 2015/0370405 A1* | 12/2015 | Oda | ................ | G06F 3/0416 |
| | | | | 715/771 |

FOREIGN PATENT DOCUMENTS

| | | |
|---|---|---|
| JP | 2010-108255 A | 5/2010 |
| JP | 2012-208689 A | 10/2012 |
| JP | 5124397 B | 1/2013 |
| JP | 2014-191780 A | 10/2014 |

\* cited by examiner

VEHICULAR INPUT DEVICE AND VEHICULAR COCKPIT MODULE

CROSS REFERENCE TO RELATED APPLICATIONS

This application is based on Japanese Patent Application No. 2014-129087 filed on Jun. 24, 2014, the disclosure of which is incorporated herein by reference.

TECHNICAL FIELD

The present disclosure relates to an input device used in a vehicle and a structure around a driving seat in the vehicle.

BACKGROUND

It has been proposed to provide a vehicular input device that includes an operation unit disposed at the hand side of a driver and a display unit disposed farther than the operation unit from the driver for improving operability.

For example, Patent Document 1 discloses a vehicular I/O (i.e., input and output) device that includes a display device arranged above an instrument panel, and an electrostatic capacity type touch pad arranged above a center console disposed between a driving seat and an assistant driver seat.

Since an operation performed by the above vehicular I/O device requires a driver to move his or her hand from the position of the driver's hand located at, for example, a steering wheel to a touch pad, which is greatly dissimilar to a display device in direction, the operation cannot be said as an intuitive operation on the display device. Moreover, a vertical input direction (i.e., vehicular front-back direction) to the input plane of the touch pad is different from a vertical input direction (i.e., vehicular up-down direction) on the surface of the display device, therefore, it is difficult to interpret the correspondence between an input operation and an input result displayed on the display device in response to the input operation.

[Patent Document 1] Japanese Patent No. 5124397

SUMMARY

It is an object of the present disclosure to provide a vehicular input device or a vehicular cockpit module that provides a vehicular input device or a vehicular cockpit module for realizing an intuitive input operation on a display device even though a driver sits at a position away from the display device and also easily interpreting the correspondence between an input operation and a result in response to the input operation.

A first aspect of the present disclosure relates to a vehicular input device, which is arranged in a vehicle having a meter hood protruding toward a driving seat from an instrument panel and surrounding a meter, for detecting an operation of a driver based on an input screen image displayed on a display device, which is arranged at a side of the meter hood, on the instrument panel.

The vehicular input device includes: a detection unit that is arranged at a side of the meter hood in space between the display device and the driving seat; and a display control unit that changes a display mode of the display device in response to an output of the detection unit.

According to the first aspect of the present disclosure, the detection unit arranged in the space between the display device and the driving seat can detect the movement of a finger pointed toward the display device as the driver extends his or her finger to the space between the display device and the driving seat. Accordingly, the driver performs an intuitive input operation on the display device even at a position away from the display device while looking at the display device.

A second aspect of the present disclosure relates to a vehicular cockpit module including: a meter hood that protrudes toward a driving seat from an instrument panel and surrounds a meter; a display device that is at a side of the meter hood and arranged near the center of a vehicle in a width direction on an instrument panel; and a vehicular input device that detects an operation of a driver based on an input screen image displayed on the display device. The vehicular cockpit module includes: a detection unit that is arranged at a side of the meter hood between the display device and the driving seat; and a display control unit that changes a display mode of the display device in response to an output of the detection unit.

Similar to the first aspect of the present disclosure, the detection unit arranged in the space between the display device and the driving seat can detect the movement of a finger pointed toward the display device as the driver extends his or her finger to the space between the display device and the driving seat. Accordingly, the driver performs an intuitive input operation on the display device even at a position away from the display device while looking at the display device, and can easily interpret the correspondence between a direction of an input operation and an input result displayed on the display device in response to the input operation.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
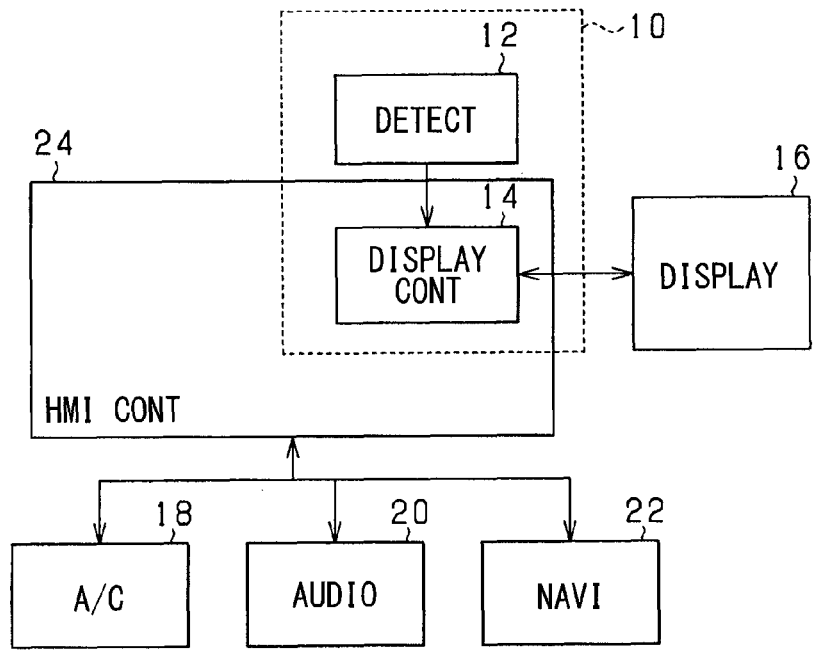
FIG. 1 is a block diagram that shows an I/O relation regarding a signal of a vehicular apparatus including an input device according to a first embodiment.

A first embodiment of the present disclosure is described with reference to FIGS. 1 through 6. FIG. 1 is a block diagram that shows an I/O relation regarding a signal of a vehicular apparatus including an input device 10 according to the present embodiment. The input device 10 according to the present embodiment is configured by a detection unit 12 and a display control unit 14. The detection unit 12 is a sensor for which a spatial input for outputting a detection result in response to the movement of the palm of a driver's hand or a driver's finger can be detected after the driver's hand shades the detection unit 12. An output signal provided from the detection unit 12 is inputted to the display control unit 14. The display control unit 14 is an arithmetic unit including, for example, a CPU and memory for display control on the display device 16. The present embodiment can be achieved as an HMI control ECU 24 for input control on other vehicular apparatuses such as an air conditioner 18, an audio 20, and a navigation system 22.

According to the present embodiment, a button image is selected on the screen of the display device 16 in response to an input from the input device 10, and a signal is inputted to other vehicular apparatuses such as the air conditioner 18, the audio 20 and the navigation system 22 when the button image is detected. It is noted that the arrow illustrated in FIG. 1 indicates an I/O relation regarding a signal. The actual connection is not necessarily restricted to one-to-one connection through a cable for communication, and the connection may use vehicular network communication or wireless network.

Figure 2:
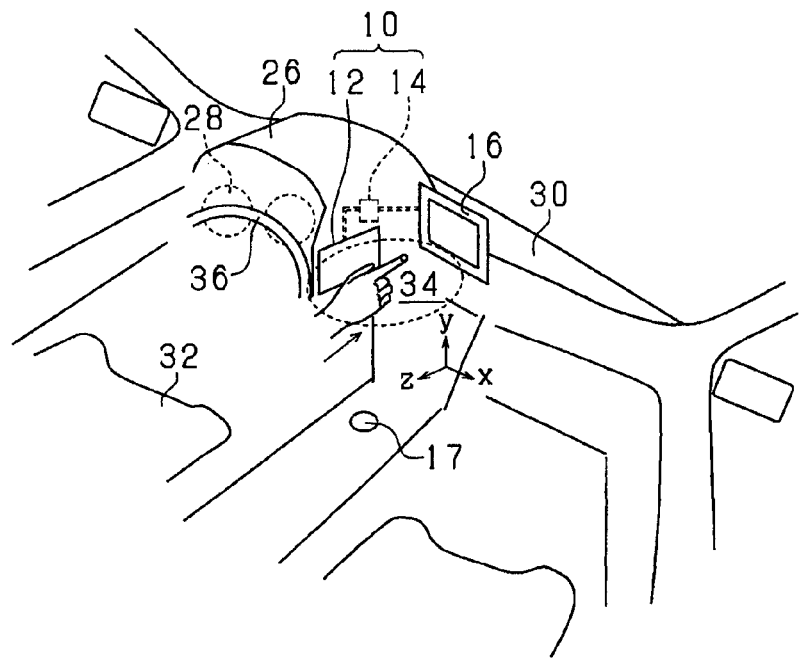
FIG. 2 is a perspective diagram that shows a vehicle cabin is equipped by the input device according to the first embodiment.

FIG. 2 is a perspective diagram that shows a cockpit module equipped by the input device 10 according to the first embodiment. The detection unit 12 according to the present embodiment is disposed at a side plane of a meter hood 26 at the center side of a vehicle. The meter hood 26 surrounds a meter 28 and protrudes toward a driving seat from an instrument panel 30. The display device 16 according to the present embodiment is disposed at the side of the meter hood 26, and is arranged near the center of a vehicle. In particular, the display device 16 is configured by, for example, a liquid-crystal panel or an organic EL panel. Additionally, the display device 16 is disposed approximately at the center of the upper part of the instrument panel 30 in a vehicular direction, that is, at the front position of the upper part of the instrument panel 30 and the center console so that the screen faces backwardly. According to this arrangement, when a driver faces in a front direction, the display device enters the driver's visual field.

In addition, by providing the detection unit 12 at the side plane of the meter hood 26, the detection unit 12 is arranged at the side of spacing 34 provided between the display device 16 and an occupant on a driving seat 32. The display device 16 displays an input screen image in which multiple button icons are in display. The display control unit 14 outputs a signal that causes the display mode to change on the display device 16 in response to an output of the detection unit 12 after an input operation performed by the driver is detected while the driver is looking at the input screen image.

According to the above configuration, a driver extends his or her finger into the spacing 34 between the display device 16 and the driver's seat 32, and the movement of the finger pointed toward the display device 16 is detected. Therefore, while the driver's line of sight faces toward the display device 16, an intuitive input operation can be performed on the display device 16 even if the driver's sitting position is away from the display device 16; or the correspondence relation between the direction of an input operation and an input result displayed on the display screen of the display device 16 in response to the input operation can also be easily interpreted. It is noted that, according to the present embodiment, it is possible to provide an input for the display device 16 without the need of separately providing a hand operation unit on the center console. However, an operation unit 17 may be operated with arranging the operation unit 17 on the center console.

Figure 3:
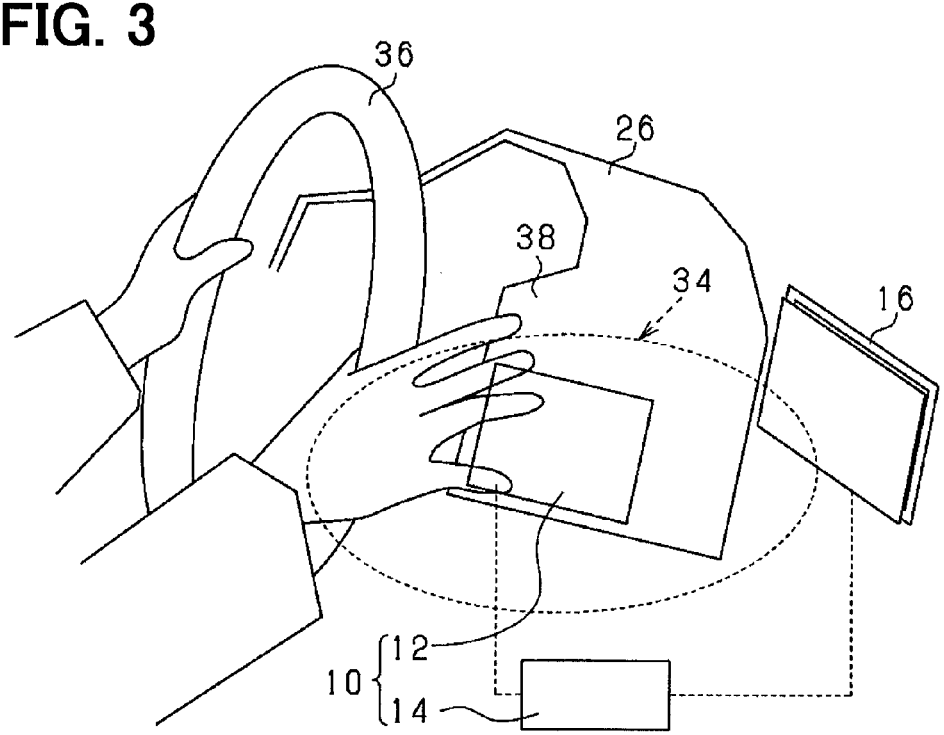
FIG. 3 is an enlarged diagram that shows the vicinity of the input device according to the first embodiment.

FIG. 3 is an enlarged diagram that shows the positional relation among the meter hood 26, a steering wheel 36, the detection unit 12 and the display device 16 according to the first embodiment. The meter hood 26 according to the present embodiment has a side surface that includes a protrusion part 38 which protrudes toward the side of the steering wheel 36 in comparison with other parts (i.e., upper surface) of the meter hold 26. The detection unit 12 has at least one part where the protrusion part 38 is provided. Therefore, the detection unit 12 can be made closer to the steering wheel 36. For example, when the detection unit 12 is configured by using the capacitance sensor, it is estimated whether the driver holds the steering wheel 36 based on an output of the capacitance sensor, and an input operation can be performed by a fingertip while the driver is holding the steering wheel 36. In addition, the detection unit 12 is a capacitance sensor including a sheet arranged with a plurality of conductors in a netlike appearance. With regard to the capacitance sensor, the capacitance between the electrode and conductors around the electrode changes as a hand moves closer to an electrode. In a case of having self-capacitance sensor, the capacitance stored in the conductors increases as a hand moves closer to the electrode. However, in a case of having a mutual-capacitance sensor, the capacitance stored in the conductors decreases as a hand moves closer to the electrode.

Figure 4:
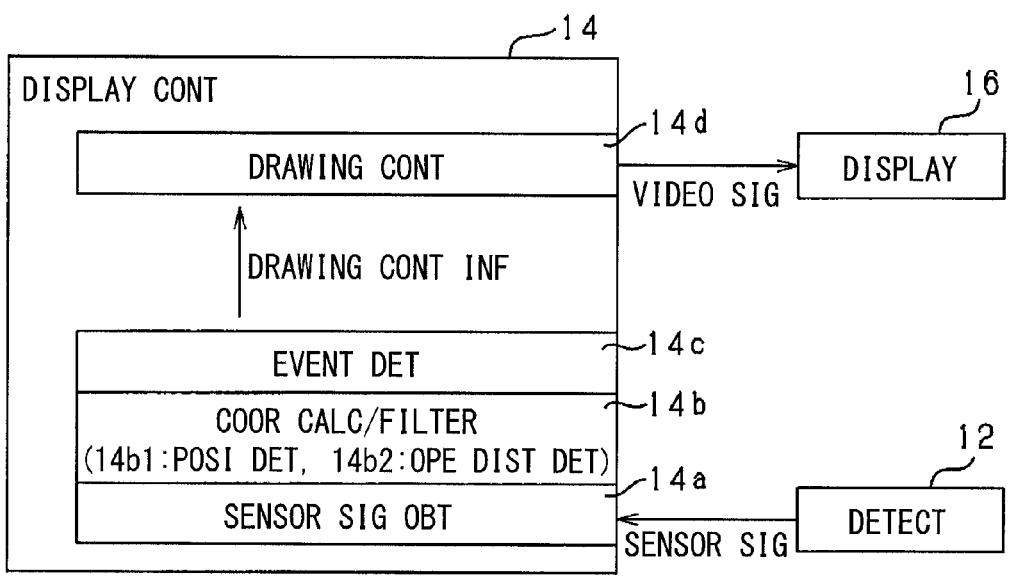
FIG. 4 is a diagram that shows the configuration of a display control unit according to the first embodiment.

FIG. 4 is a diagram that shows the configuration of the display control unit 14. The display control unit 14 has a CPU which executes a variety of programs so as to achieve the functions of the after-mentioned sensor signal obtaining unit 14a, coordinate calculation and filtering unit 14b, event determining unit 14c and drawing control unit 14d.

The sensor signal obtaining unit 14a obtains a sensor signal from the detection unit 12. The signal according to the present embodiment includes a capacitance value stored into conductors of a capacitance sensor and a position regarding the capacitance value. The coordinate calculation and filtering unit 14b includes a position detection unit 14b1 and an operation distance detection unit 14b2 that calculates a coordinate with a change in the capacitance value of a conductor in comparison with the absence of the driver's hand near the capacitance sensor constituting the detection unit 12 and performs signal processing such as filtering regarding a capacitance value. More specifically, the position detection unit 14b1 detects a position where the finger tip of the operating finger projects on a two-dimensional plane of the capacitance sensor based on a change in capacitance. Additionally, the operation distance detection unit 14b2 detects the distance between the capacitance sensor and the operating finger.

For example, the capacitance sensor is disposed at the right outer surface of the meter hood 26 such that X-direction, Y-direction and Z-direction are respectively configured as a horizontal direction, a vertical direction and a direction facing toward a rear side of the vehicle. In this situation, the position detection unit 14b1 detects the position of a fingertip of the operating finger at an YZ-plane. Additionally, the operation distance detection unit 14b2 detects the position of a fingertip of the operating finger in the X-direction.

The event determining unit 14c determines whether the present situation is in an idle state, a proximity state or a contact state. Since the capacitance sensor constituting the detection unit 12 is not too far from the steering wheel 36, the capacitance stored in the conductors at the side of the steering wheel has a slight change in the situation where the driver holds the steering wheel 36 in comparison with the situation where the driver's hand is not located near the capacitance sensor. Therefore, the event determining unit 14c determines that the present situation is in an idle state where the driver's hand is disposed at the steering wheel 36 when there is a variation in capacitance from a value at the time in which the driver does not put his or her hand on the steering wheel 36, for example, the amount of variation is less than a first threshold value. In addition, the present embodiment adopts a self-capacitance sensor in which the amount of variation in capacitance gets larger as the driver's hand moves closer to the capacitance sensor. Thus, the event determining unit 14c determines that the present situation is in a proximity state in which the driver's hand approaches to the capacitance sensor when the amount of variation in capacitance is larger than a first threshold value and less than a second threshold value (i.e., the first threshold value<the second threshold value). Moreover, the event determining unit 14c determines that the present situation is in a contact situation in which the driver's hand touches the capacitance sensor when the amount of variation in capacitance is larger than the second threshold value, and confirms the input of an icon for information input displayed on a position corresponding to the contact position on the display device 16.

The drawing control unit 14d performs control of drawing to be displayed on the display device 16 in response to the determination performed by the event determining unit 14c. For example, the icon used for the input of information for the display device 16 is not displayed when the present situation is in an idle state. In addition, the icon used for the input of information for the display device 16 is displayed when the present situation is in a proximity state. Moreover, the icon that has been selected is reversely displayed and then the control causing the screen to display in response to the content of processing subsequent to the processing of inputted information is performed when the present situation is in a contact state.

Since the present embodiment presents an example of a vehicle with a steering wheel on the left side, the embodiment illustrates that the driver performs an input operation with his or her right hand and the input operation is detected by the detection unit 12 disposed at the right outer surface of the meter hood 26. However, the present invention is not restricted to the above example. For the vehicle with a steering wheel on the right side, an input operation is carried out with the left hand so that the detection unit 12 and the display device 16 may be configured to be disposed at the left side of the meter hood. Additionally, in the present embodiment, the capacitance sensors for constituting the detection unit 12 are configured to be disposed only at one side of the meter hood 26 (i.e., at the side near the vehicular center), however, the present invention is not restricted to the above matter. An extra one sheet having a capacitance sensor may be arranged at the outer side surface of the meter hood opposite to the display device 16 and used as an operation switch such as a direction guiding device, headlight or a windshield wiper.

Figure 5:
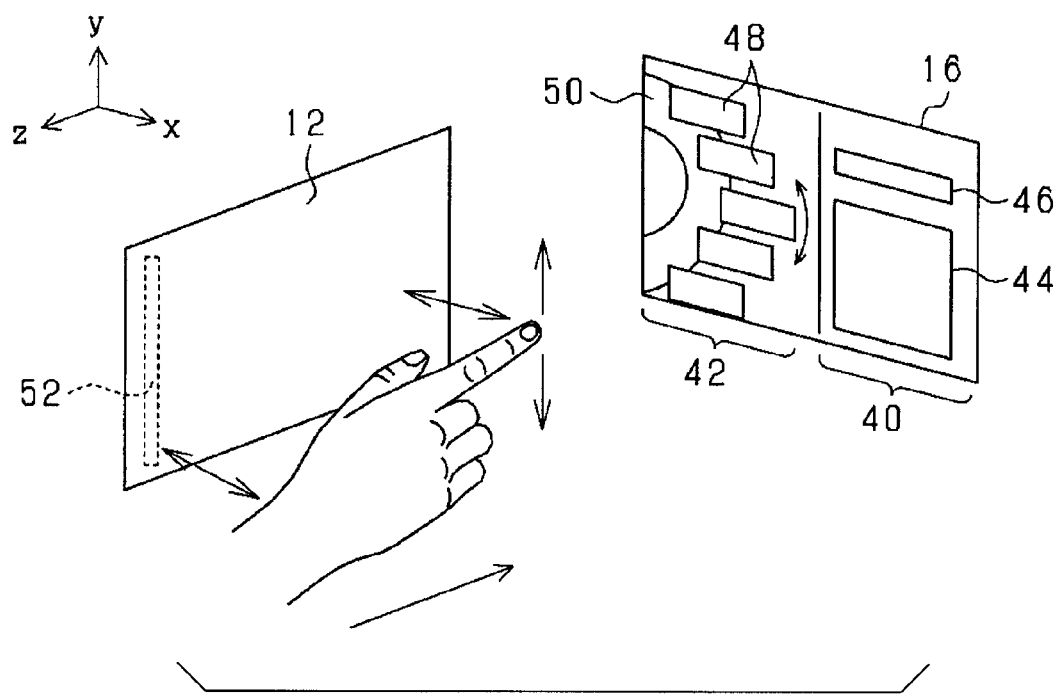
FIG. 5 is a diagram that shows an example of an input operation according to the first embodiment and an input screen image displayed on the display device.

FIG. 5 is a diagram that particularly illustrates the input operation detected by the detection unit 12 according to the above-mentioned present embodiment and the transition of the input screen image on the display device 16 in response to the input operation. The input screen image exemplified in FIG. 5 is an input screen image related to an audio operation controlled by the display control unit 14, and the input screen image is bisected into a right region 40 and a left region 42. The right region 40 includes a region 44 which displays the jacket photographs of a music album in play or the list of music songs included in the music album in play, and a region 46 which displays the album's name in play back or the name of a song in play back. At the left region 42, a plurality of rectangular regions 48 indicative of names of other selectable music albums are lined up vertically. The plurality of rectangular regions 48 are lined up along a half-moon shaped guiding line 50 at substantially equal intervals so as to form an arc.

The display control unit 14 estimates the vertical position of the driver's finger and the spacing (in an X-direction in FIG. 5) between the driver's finger and the detection unit 12 based on the output of the detection unit 12 and moves the rectangular region 48 in an arrow direction along the guiding line in synchronization with the vertical movement of the driver's finger. Thus, the driver extends his or her hand to the side surface of the detection unit 12 and moves the fingertip vertically so that one region can be selected from the plurality of rectangular regions (i.e., an icon image indicative of a music album's name) lined up vertically for playing a next music album.

Figure 12:
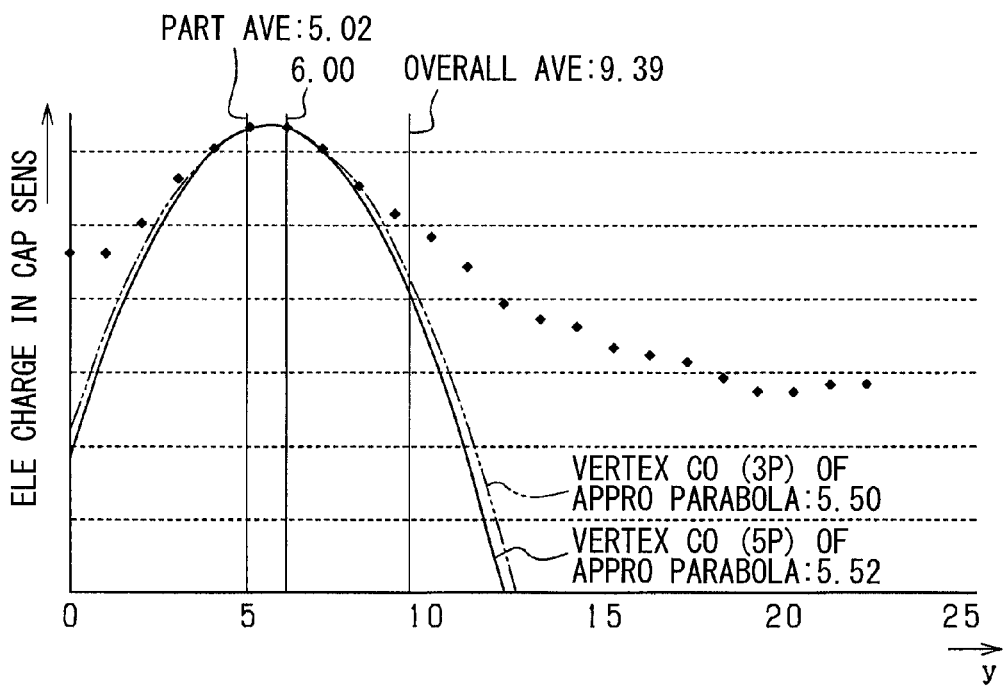
FIG. 12 is a diagram that illustrates positional estimation in a vertical direction regarding the driver's finger based on the amount of an electrical charge stored in all horizontal electrodes in the capacitance sensor.

The method in which the above-mentioned position detection unit 14b1 detects the vertical position of the driver's fingertip based on the amount of variation in capacitance is described with reference to FIG. 12. The horizontal axis of the graph illustrated in FIG. 12 indicates a vertical displacement (i.e., Y-direction in FIG. 5), the positions of the electrodes 56 in a horizontal direction arranged at the bottom edge of the capacitance sensor is set to be zero. In addition, the vertical axis of the graph shown in FIG. 12 indicates the amount of charge stored between the driver's finger and the horizontal electrode 56 in a case of using a self-capacitance sensor. Moreover, the diamond-shaped marker in the graph illustrated in FIG. 12 indicates the amount of charge stored in each of the horizontal electrodes 56.

The position detection unit 14b1 according to the present embodiment initially extracts the amount of charge in three or five horizontal electrodes 56 around the horizontal electrodes 56 which store even larger amount of charge, and consequently approximates a curve connecting the points representing the values of the amount of charge with a parabola formed to be convex. Then, the position detection unit 14b1 estimates the vertical position of the driver's finger with the use of a vertex coordinate (i.e., 5.50 or 5.52) of the approximated parabola. Therefore, as comparing the case of averaging vertical positions based on the charge stored in all horizontal electrodes 56 (i.e., 9.39) with the case of averaging vertical positions based on the charge stored in a part of horizontal electrodes 56 (i.e., 5.02), it is possible to obtain more accurate values.

When the display control unit 14 determines that the spacing between the detection unit 12 and the driver's finger is shorter than a predetermined threshold value, the display control unit 14 determines that an input has been determined on an icon image regarding a music album indicated by a rectangular region under selection and consequently confirms the input so as to change the display mode of the right region 40. The predetermined threshold value, which is compared with the spacing between the detection unit 12 and the driver's finger for confirming an input, is preferably to be configured as a distance such that the driver exactly touches the detection unit 12 with his or her finger so as to inhibit an improper operation of the driver.

In addition to the selection and determination of a music album, the selection and determination of a musical piece in music albums may also be carried out based on a signal detected by the detection unit 12. In this situation, a switching button for switching between two modes, that is, a music album selection mode and a musical piece selection mode may be provided on an operation screen (i.e., Graphical User Interface (GUI)). For example, when a music album is selected, a transition to the musical piece selection mode is automatically made. The transition from the music album selection mode to the musical piece selection mode may display, for example, an image of a switching button indicative of switching to the music album selection mode at the end of a music list.

Although the present disclosure may not be restricted to the GUI illustrated in FIG. 5, the driver performs an aerial operation by vertically moving his or her fingertip extended toward the display device 16 to select one of the plurality of rectangular regions 48 (i.e., icon images) lined up vertically depicting an arc and perform the operation of confirming an selection input by moving his or her fingertip to the left (or right in a right-hand drive vehicle) in a series of flow.

It is noted that the detection unit 12 according to the present embodiment is a capacitance sensor, and the detection unit 12 estimates the position of the driver's finger in the spacing 34 between the display device 16 and the driving seat based on the amount of change in capacitance of the capacitance sensor to change the display mode of the display device based on a change in the estimated position of the finger. Thus, the influence due to external environment such as sunlight can be inhibited in comparison with using other devices such as a camera.

Herein, since the output regarding the capacitance sensor depends on distance between a detected object and the capacitance sensor and an opposite area between the detected object and the capacitance sensor, it is difficult to determine whether the distance between the detected object and the capacitance sensor is relatively larger and whether the opposite area between the detected object and the capacitance sensor is relatively larger only based on the amount of charge stored in the capacitance sensor. In other words, the opposite area between the driver's hand and the capacitance sensor arranged on the most rear part in a moving direction regarding the driver's hand may get excessively smaller or easily change in response to the position of the driver's hand or the length of the driver's finger. In the present embodiment, when the driver extends his or her hand or finger toward the display device, the present embodiment focuses on the matter in that the opposite area regarding the root side of the driver's finger opposite to an edge region 52 in the front of the capacitance sensor (i.e., at the back side of a vehicle) or the driver's palm is without being much influenced by the position of the driver's hand or the length of the driver's finger so as to ensure a certain size, and uses a predetermined constant as an opposite area regarding the root side of a finger opposite to the edge region 52 in front of the capacitance sensor or the palm of a driver's hand.

Figure 6:
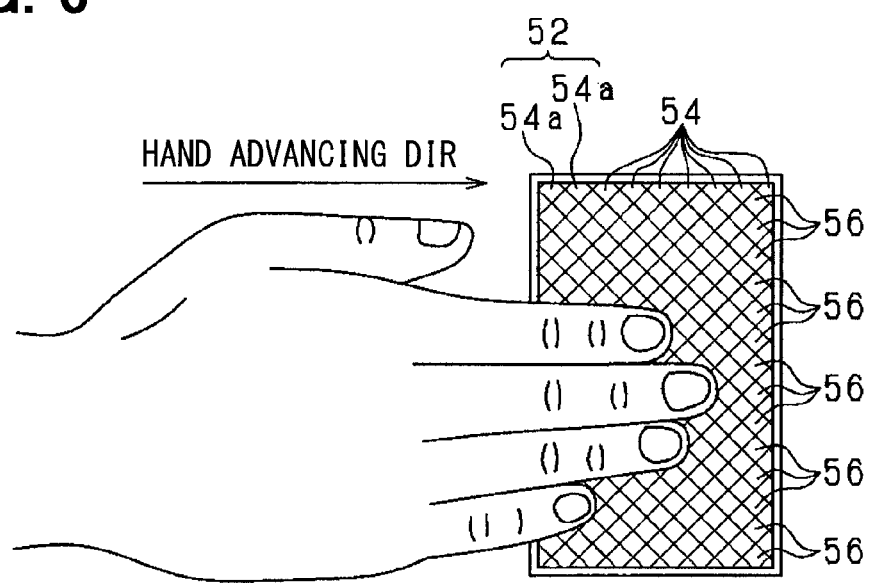
FIG. 6 is a diagram that shows a detection unit and the advancing direction of the driver's hand according to the first embodiment.
Figure 11:
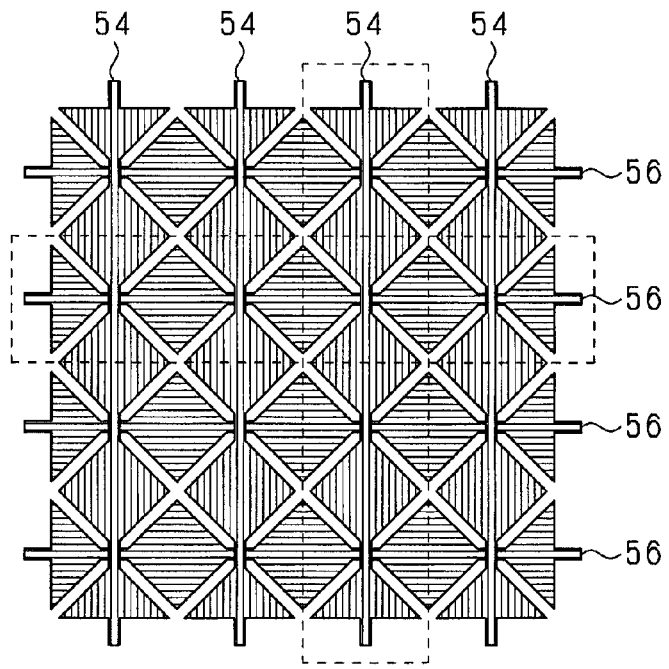
FIG. 11 is an enlarged diagram that shows horizontal electrodes and vertical electrodes in a capacitance sensor according to the above embodiments.

FIG. 6 is a diagram that illustrates the detection unit 12 according to the present embodiment and a moving direction regarding a driver's hand. The detection unit 12 according to the present embodiment is configured by a plurality of vertical electrodes 54 in a manner that a plurality of diamond-shaped patterns are vertically lined up and a plurality of horizontal electrodes 56 in a manner that a plurality of diamond-shaped patterns are lined up horizontally (see FIG. 11). The edge region 52 at the front side is configured by electrodes 54*a* arranged at the back of the vehicle among the vertical electrodes arranged to be lined up in a front-back direction of the vehicle. The display control unit 14 estimates the amount of an electrical charge stored in the electrodes 54*a* arranged mostly at the back side of the vehicle and the horizontal electrodes 56 and the distance between the detection unit 12 and the driver's finger based on a parameter, which is preliminarily set, indicative of an opposite area between the finger and the edge region 52 of the detection unit 12. Consequently, the vertical position (i.e., Y-direction in FIG. 5) of a finger is estimated based on the area where an electrical charge is unevenly stored, and the horizontal position (i.e., X-direction in FIG. 5) of the finger is estimated based on the amount of an electrical charge stored in the edge region 52 in front of the capacitance sensor so that the movement of a finger can be accurately detected.

It is noted that the above embodiment detects the position of the driver's finger in a horizontal direction (i.e., X-direction) based on the amount of an electrical charge stored in the capacitance sensor. However, in a case where the capacitance sensor has a function for outputting the number of contact points, it can be determined whether the driver touches the detection unit with his or her finger based on a signal indicative of the number of contact points instead of the positional estimation in a horizontal direction by using the capacitance to confirm an input to the selected button image.

According to the above-mentioned first embodiment, the following effects can be generated.

A driver performs an input operation with his or her hand away from the display device and easily realizes the correspondence between the input operation and the input of information in response to the input operation.

A driver may touch the capacitance sensor arranged at a position corresponding to the display position of the selected icon images in a vertical direction. Thus, the driver views the icon images displayed on the display device 16 and performs an intuitive input operation.

The contact against the capacitance sensors is set as an input determination of the icon image, therefore, the present embodiment provides operational feeling for the driver, and an input operation through sliding while making a contact can be performed.

The display device 16 is arranged at a center above the instrument panel 30. Additionally, the capacitance sensor is arranged at the outer side surface of the left and right of the meter hood 26 covering the outer perimeter of the meter 28 opposite to the steering wheel 36. Accordingly, the capacitance sensor can be arranged near the steering wheel 36. Consequently, since an input operation can be achieved as slightly moving a hand toward the display device 16 from a state where the hand is put on the steering wheel 36, there is low possibilities to impair the safety of driving.

It can be detected that the driver holds the steering wheel 36 based on capacitance of the capacitance sensor. Moreover, when it is detected that the driver holds the steering wheel 36, the present situation is determined to be in an idle state where an input operation is not carried out.

With regard to the capacitance sensor, the distance is detected based on a change in an electrical charge stored in the electrodes at a part near the moving direction regarding the driver's hand so that the distance between the capacitance sensor and the hand can be detected with a higher precision.

When the driver's hand moves in a predetermined direction from a state where the hand is originally put on the steering wheel 36, the operation distance between the capacitance sensor and the hand can be detected based on a change in capacitance of the capacitance sensors arranged at the part near the hand's moving direction.

When the driver's hand moves to the capacitance sensor from the steering wheel 36, the palm of a driver's hand faces the capacitance sensors, and the opposite area between the hand and the capacitance sensor arranged at the part near the hand's moving direction gets larger. Accordingly, the operation distance between the capacitance sensor and the hand can be detected with a higher accuracy.

The meter hood 26 is disposed slightly in front of the steering wheel 36. Thus, when the driver's hand slightly moves to the front from the steering wheel 36, the position and operation distance regarding the operation finger can be detected.

(Second Embodiment)

Figure 7:
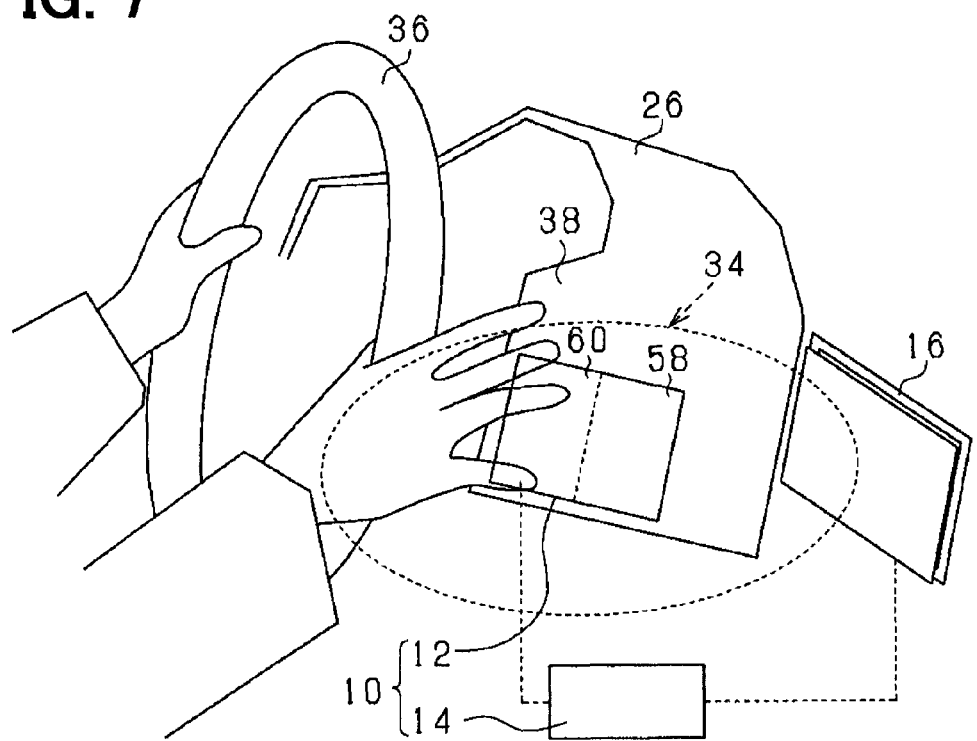
FIG. 7 is an enlarged diagram of an input device according to a second embodiment.
Figure 8:
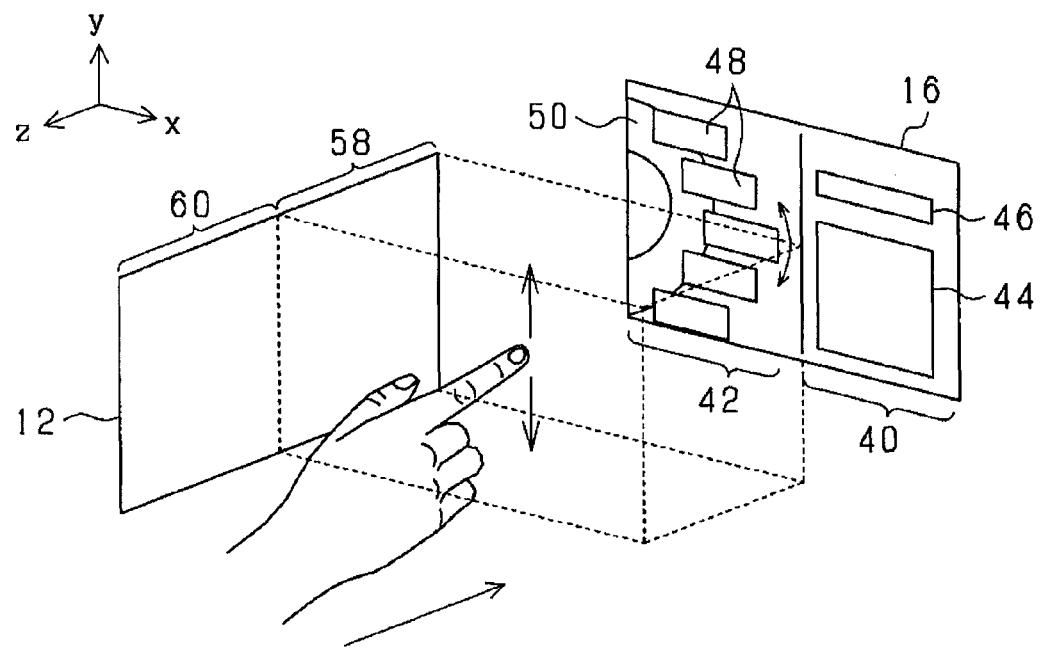
FIG. 8 is a diagram that shows a selecting operation on the input device according to the second embodiment.
Figure 9:
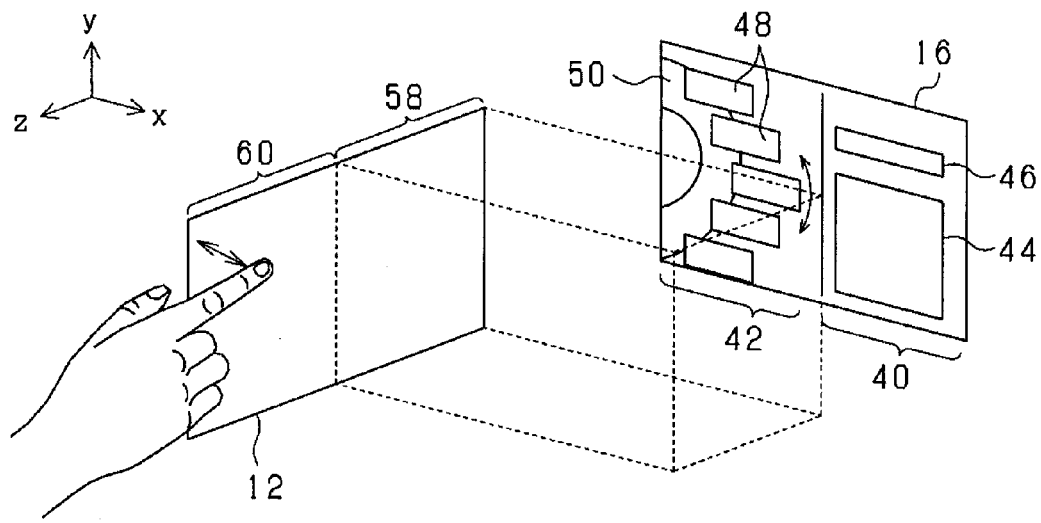
FIG. 9 is a diagram that shows a determining operation on the input device according to the second embodiment.

FIG. 7 is a diagram shows the enlargement of an input device 10 according to a second embodiment. The above-mentioned first embodiment detects the vertical position (i.e., Y-direction in FIG. 5) of the driver's finger in the entire region of the detection unit 12, whereas the present embodiment bisects the detection unit 12 into a front region 58 in a vehicle travelling direction and a rear region 60 in a vehicle travelling direction so that the vertical position of the driver's finger is detected only in the front region 58. That is, as shown in FIG. 8, the driver extends his or her finger until the front region 58 and moves the finger vertically. After selecting a music album to be played, the driver moves his or her finger back to the rear region 60 and then the driver performs a determining operation.

Thus, it can be prevented that the selection item such as a music album, which has been once selected, is switched to another selection item caused by the finger's position moving vertically without the driver's intention until completing the determining operation by moving the finger closer to the detection unit 12 (i.e., touching the detection unit 12 in the first embodiment and the present embodiment). In other words, the detection unit 12 is divided into multiple regions and the items, which can be inputted, are divided into each region so that an improper operation can be prevented.

(Third Embodiment)

Figure 10:
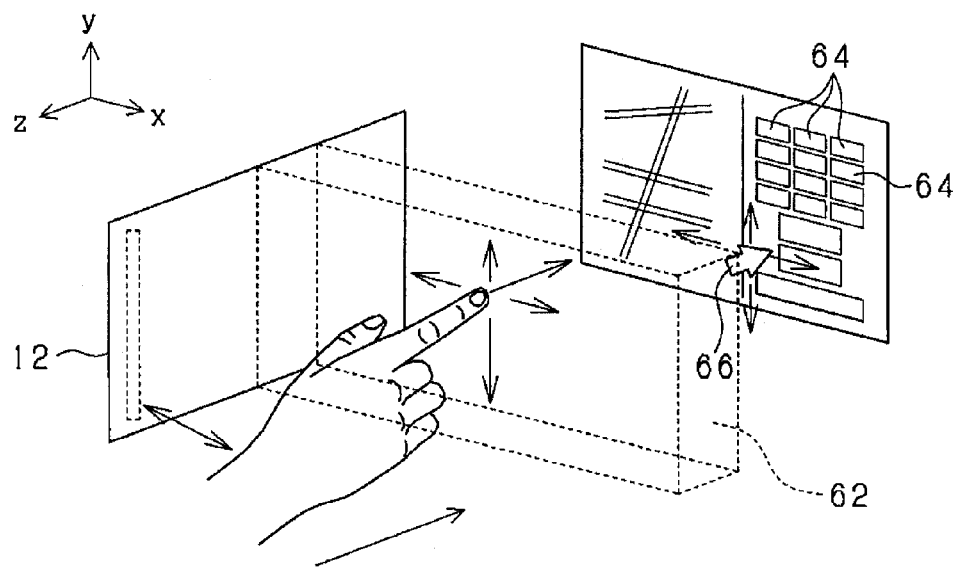
FIG. 10 is a diagram that shows a selecting operation and a determining operation on an input device according to the third embodiment.

FIG. 10 is a diagram that shows an input device according to a third embodiment. In the first and second embodiments, with regard to an aerial operation by vertically moving a fingertip, one of a plurality of icon images lined up vertically is selected, and the fingertip is moved horizontally and then an input selection is confirmed. However, the present embodiment carries out a selection input through an aerial operation by moving a fingertip vertically and horizontally, and a selection input is confirmed by further moving the fingertip forward.

Specifically, the display control unit 14 causes a plurality of icon images 64 or a cursor 66 to be displayed as a display input screen image of the display device 16. The space between the display device 16 and the driving seat is substantially perpendicular to the detection unit 12. A virtual input plane 62 is configured such that the distance from the display device 16 corresponds to a predetermined range in the space, and the position of the driver's finger is estimated on the virtual input plane 62 based on the output of the detection unit 12. Then, one icon image is selected from the plurality of icon images 64 in response to the estimated finger's position.

Therefore, one icon image can be selected from the plurality of icon images 64 lined up two-dimensionally not only in a vertical direction so that an input to a complicated system in comparison with the above embodiment can be performed. In addition, the determination of a selection input according to the third embodiment is the matter in that the driver's finger passes through the virtual input plane 62 and advances to the side of the display device 16. That is, when the distance between the display device 16 and the finger is closer to the predetermined range, the input to the icon image 64 is selected in response to the position of the driver's finger on the virtual input plane 62. Thus, an input to the icon image under selection based on a signal from the detection unit can be confirmed without the need to provide a determination button or the like separately. It is noted that the horizontal position of a finger (i.e., X-direction in FIG. 7) may be estimated based on the amount of an electrical charge stored in the edge region 52 in the front of the capacitance sensor that is identical to the above-mentioned embodiment.

(Other Embodiment)

In the above-mentioned embodiments, the detection unit 12 is configured by one capacitance sensor; however, the present disclosure is not restricted to this matter. The detection unit 12 may be configured by a sheet having a plurality of capacitance sensors.

In the above embodiments, a capacitance sensor having a diamond array which arranges and laminates self-capacitance diamond-shaped conductors is used as the detection unit; however, the present disclosure is not restricted to this matter. The detection unit 12 may be configured by a capacitance sensor having a Manhattan array that arranges and laminates linear conductors on a game board, or other spatial input devices such as an infrared-light sensor, laser sensor or camera.

The present disclosure has the following aspects.

A first aspect of the present disclosure relates to a vehicular input device, which is arranged in a vehicle having a meter hood protruding toward a driving seat from an instrument panel and surrounding a meter, for detecting an operation of a driver based on an input screen image displayed on a display device, which is arranged on the instrument panel at a side of the meter hood. The vehicular input device includes: a detection unit that is arranged at a side of the meter hood between the display device and the driving seat; and a display control unit that changes a display mode of the display device in response to an output of the detection unit.

According to the first aspect of the present disclosure, the detection unit arranged between the display device and the driving seat can detect the movement of a finger pointed toward the display device as the driver extends his or her finger to the space between the display device and the driving seat. Accordingly, the driver performs an intuitive input operation on the display device even at a position away from the display device while looking at the display device.

Alternatively, the display control unit may control the display device to display a plurality of icon images lined up vertically as the input screen image and estimate a vertical position of a driver's finger and a distance between the detection unit and the driver's finger based on an output of the detection unit, select one icon image from the plurality of icon images lined up vertically based on an estimated vertical position, confirm an input to the one icon image under selection after determining that the distance between the detection unit and the driver's finger is shorter than a predetermined threshold value, and change a display mode of the display device. Accordingly, as the driver extends his or her finger toward the display device, a series of operation of selecting one icon image from the plurality of icon images lined up vertically and confirming an input can be performed.

Alternatively, the display control unit may control the display device to display a plurality of icon images lined up two-dimensionally as the input screen image, set a virtual input plane in space between the display device and the driving seat, estimate a position of a driver's finger on the virtual input plane based on an output of the detection unit, and select one icon image from the plurality of icon images in response to the position of the driver's finger. Accordingly, the driver can select one icon image from the plurality of icon images lined up two-dimensionally not just only in a vertical direction so that an input to the operation system which is more complicated than the above-mentioned aspect can be performed.

Alternatively, the display control unit may determine whether a distance between the display device and the driver's finger is shorter than a predetermined range, and confirm an input to the one icon image selected in response to a position of the driver's finger on the virtual input plane when the distance is shorter than the predetermined range, and change a display mode of the display device. Accordingly, an input to the icon image under selection can be confirmed based on a signal from the detection unit without separately providing a determination button.

Alternatively, the detection unit may be a capacitance sensor. Additionally, the display control unit may estimate a position of a driver's finger in the space between the display device and the driving seat based on a change in capacitance of the capacitance sensor and change a display mode of the display device based on a change in the estimated position of the driver's finger. Accordingly, the influence caused by external environment such as sunlight in comparison with other devices such as a camera can be prevented.

Alternatively, the capacitance sensor may include a plurality of conductors arranged at least in a vehicular front-back direction, and the display control unit may estimate a distance between the capacitance sensor and the driver's finger based on an amount of an electrical charge stored in a part of the plurality of conductors, which are arranged at a back side of a vehicle. Accordingly, the distance between the capacitance sensor and the driver's fingertip can be accurately estimated.

A second aspect of the present disclosure relates to a vehicular cockpit module including: a meter hood that protrudes toward a driving seat from an instrument panel and surrounds a meter; a display device that is disposed at a side of the meter hood and arranged near a center of a vehicle in a width direction on the instrument panel; and a vehicular input device that detects an operation of a driver based on an input screen image displayed on the display device. The vehicular input device includes a detection unit that is arranged at a side of the meter hood in space between the display device and the driving seat, and a display control unit that changes a display mode of the display device in response to an output of the detection unit.

Accordingly, similar to the first aspect of the present disclosure, the detection unit in the space between the display device and the driving seat can detect the movement of a finger pointed toward the display device as the driver extends his or her finger to the space between the display device and the driving seat. Accordingly, the driver performs an intuitive input operation on the display device even at a position away from the display device while looking at the display device, and can easily interpret the correspondence between a direction of an input operation and an input result displayed on the display device in response to the input operation.

Alternatively, the detection unit may be a capacitance sensor including a plurality of conductors arranged at least in a vehicular front-back direction, and the display control unit may estimate the position of the driver's finger in the distance between the display device and the driving seat based on the amount of an electrical charge in a part of the plurality of conductors, which are arranged at a back side of a vehicle, and change a display mode of the display device based on a change in the estimated position of the driver's finger. Accordingly, when the driver extends his or her finger toward the display device, the distance between the capacitance sensor and the driver's fingertip can be estimated based on the amount of an electrical charge stored in the conductors, which are arranged at the back of the vehicle, opposite to the fingertip or the palm of the driver's hand.

Alternatively, the meter hood may have a side surface that protrudes toward a steering wheel of the vehicle in comparison with other parts of the meter hood, and the detection unit may be arranged at a protruded side surface. Accordingly, it is possible to make the steering wheel closer to the detection unit, and the detection unit can detect a state where the driver is holding the steering wheel.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claim is:

1. A vehicular input device, which is arranged in a vehicle having a meter hood protruding toward a driving seat from an instrument panel and surrounding a meter, for detecting an operation of a driver based on an input screen image displayed on a display device, which is arranged on the instrument panel at a side of the meter hood, the vehicular input device comprising:
   a detector that is arranged at a side surface of the meter hood in space between the display device and the driving seat and configured to detect a spatial hand movement; and
   a display controller that changes a display mode of the display device in response to an output concerning the detected spatial hand movement of the detector.

2. The vehicular input device according to claim 1, wherein the display controller:
   controls the display device to display a plurality of icon images lined up vertically as the input screen image;
   estimates a vertical position of a driver's finger and a distance between the detector and the driver's finger based on an output of the detector;
   selects one icon image from the plurality of icon images lined up vertically based on an estimated vertical position;
   confirms an input to the one icon image under selection after determining that the distance between the detector and the driver's finger is shorter than a predetermined threshold value; and
changes the display mode of the display device.

3. The vehicular input device according to claim 1, wherein the display controller:
controls the display device to display a plurality of icon images lined up two-dimensionally as the input screen image;
sets a virtual input plane in the space between the display device and the driving seat;
estimates a position of a driver's finger on the virtual input plane based on an output of the detector; and
selects one icon image from the plurality of icon images in response to the position of the driver's finger.

4. The vehicular input device according to claim 3, wherein the display controller:
determines whether a distance between the display device and the driver's finger is shorter than a predetermined range;
confirms an input to the one icon image selected in response to a position of the driver's finger on the virtual input plane when the distance is shorter than the predetermined range; and
changes a display mode of the display device.

5. The vehicular input device according to claim 1, wherein the detector is a capacitance sensor, and
wherein the display controller estimates a position of a driver's finger in the space between the display device and the driving seat based on a change in capacitance of the capacitance sensor, and changes the display mode of the display device based on a change in an estimated position of the driver's finger.

6. The vehicular input device according to claim 5, wherein the capacitance sensor includes a plurality of conductors arranged at least in a vehicular front-back direction, and
wherein the display controller estimates a distance between the capacitance sensor and the driver's finger based on an amount of an electrical charge stored in a part of the conductors, which are arranged at a back side of a vehicle.

7. A vehicular cockpit module comprising:
a meter hood that protrudes toward a driving seat from an instrument panel and surrounds a meter;
a display device that is disposed at a side of the meter hood and arranged near a center of a vehicle in a width direction on the instrument panel; and
a vehicular input device that detects an operation of a driver based on an input screen image displayed on the display device,
wherein the vehicular input device includes:
a detector that is arranged at a side of the meter hood in space between the display device and the driving seat and configured to detect a spatial hand movement; and
a display controller that changes a display mode of the display device in response to an output concerning the detected spatial hand movement of the detector.

8. The vehicular cockpit module according to claim 7, wherein the detector is a capacitance sensor, and
wherein the display controller estimates a position of a driver's finger in the space between the display device and the driving seat based on a change in capacitance of the capacitance sensor, and changes a display mode of the display device based on a change in an estimated position of the driver's finger.

9. The vehicular cockpit module according to claim 8, wherein the meter hood has a side surface that protrudes toward a steering wheel of the vehicle in comparison with other parts of the meter hood, and
wherein the detector is arranged at a protruded side surface.

10. The vehicular cockpit module according to claim 8, wherein the detector is a capacitance sensor including a plurality of conductors arranged at least in a vehicular front-back direction, and
wherein the display controller:
estimates a distance between the capacitance sensor and the driver's finger based on an amount of an electrical charge in a part of the plurality of conductors, which are arranged in a back side of a vehicle; and
changes a display mode of the display device based on the change in the estimated position of the driver's finger.

11. A vehicular cockpit module comprising:
a meter hood that protrudes toward a driving seat from an instrument panel and surrounds a meter;
a display device that is disposed at a side of the meter hood and arranged near a center of a vehicle in a width direction on the instrument panel; and
a vehicular input device that detects an operation of a driver based on an input screen image displayed on the display device,
wherein the vehicular input device includes:
a detector that is arranged at a side of the meter hood in space between the display device and the driving seat to detect a spatial hand movement; and
a display controller that changes a display mode of the display device in response to an output of the detector,
wherein the detector is a capacitance sensor, and
wherein the display controller estimates a position of a driver's finger in the space between the display device and the driving seat based on a change in capacitance of the capacitance sensor, and changes a display mode of the display device based on a change in an estimated position of the driver's finger.

* * * * *